(12) United States Patent
Burch et al.

(10) Patent No.: US 11,623,767 B2
(45) Date of Patent: Apr. 11, 2023

(54) RELATIONAL TIME-SERIES CLASSIFICATION METHOD AND SYSTEM FOR CORROSION MAINTENANCE DISPATCH

(71) Applicant: The Boeing Company, Chicago, IL (US)

(72) Inventors: Alexander S. Burch, Chicago, IL (US); Clinton E. Thompson, Chicago, IL (US); John M. Boggio, Chicago, IL (US)

(73) Assignee: The Boeing Company, Chicago, IL (US)

( * ) Notice: Subject to any disclaimer, the term of this patent is extended or adjusted under 35 U.S.C. 154(b) by 751 days.

(21) Appl. No.: 16/520,526

(22) Filed: Jul. 24, 2019

(65) Prior Publication Data

US 2021/0024228 A1    Jan. 28, 2021

(51) Int. Cl.
*B64F 5/60* (2017.01)
*G01C 21/20* (2006.01)
*G06N 3/08* (2006.01)

(52) U.S. Cl.
CPC .............. *B64F 5/60* (2017.01); *G01C 21/20* (2013.01); *G06N 3/08* (2013.01)

(58) Field of Classification Search
None
See application file for complete search history.

(56) References Cited

U.S. PATENT DOCUMENTS

2007/0244841 A1* 10/2007 Vatchkov ............. G05B 23/024
706/16
2020/0391884 A1* 12/2020 Hawley ................ G07C 5/0816

OTHER PUBLICATIONS

Lu Xu, Multivariate Data Classification Using PolSOM, 2011, IEEE (Year: 2011).*
Self-Organizing Map, Jul. 17, 2019, Wikipedia (Year: 2019).*
Support Vector Machine Jul. 18, 2019, Wikipedia (Year: 2019).*
Tony Yiu, Understanding Random Forest, Jun. 12, 2019, Towards Data Science (Year: 2019).*
What Causes Planes to Corrode?, Aug. 26, 2016, Brightwork (Year: 2016).*

* cited by examiner

Primary Examiner — James J Lee
Assistant Examiner — Wenyuan Yang
(74) Attorney, Agent, or Firm — McDonnell Boehnen Hulbert & Berghoff LLP

(57) ABSTRACT

Examples for relational time-series classification method for corrosion maintenance dispatch. A method may involve generating a self-organizing map for each parameter that corresponds to a group of aircraft. The self-organizing map organizes time-series data associated with a parameter into a two-dimensional representation. The method may further involve, for each map, identifying polar coordinates that represent a location of a particular node, in a grid of nodes within the self-organizing map, that is located closest to the time-series data organized in the two-dimensional representation. The method may then involve providing polar coordinates identified from each self-organizing map, along with indications of corrosion levels corresponding to the aircraft, as inputs into a classification model to train the classification model to determine trends between the parameters. The classification model is configured to subsequently use the one or more trends collectively to estimate a corrosion level for a particular aircraft.

20 Claims, 6 Drawing Sheets

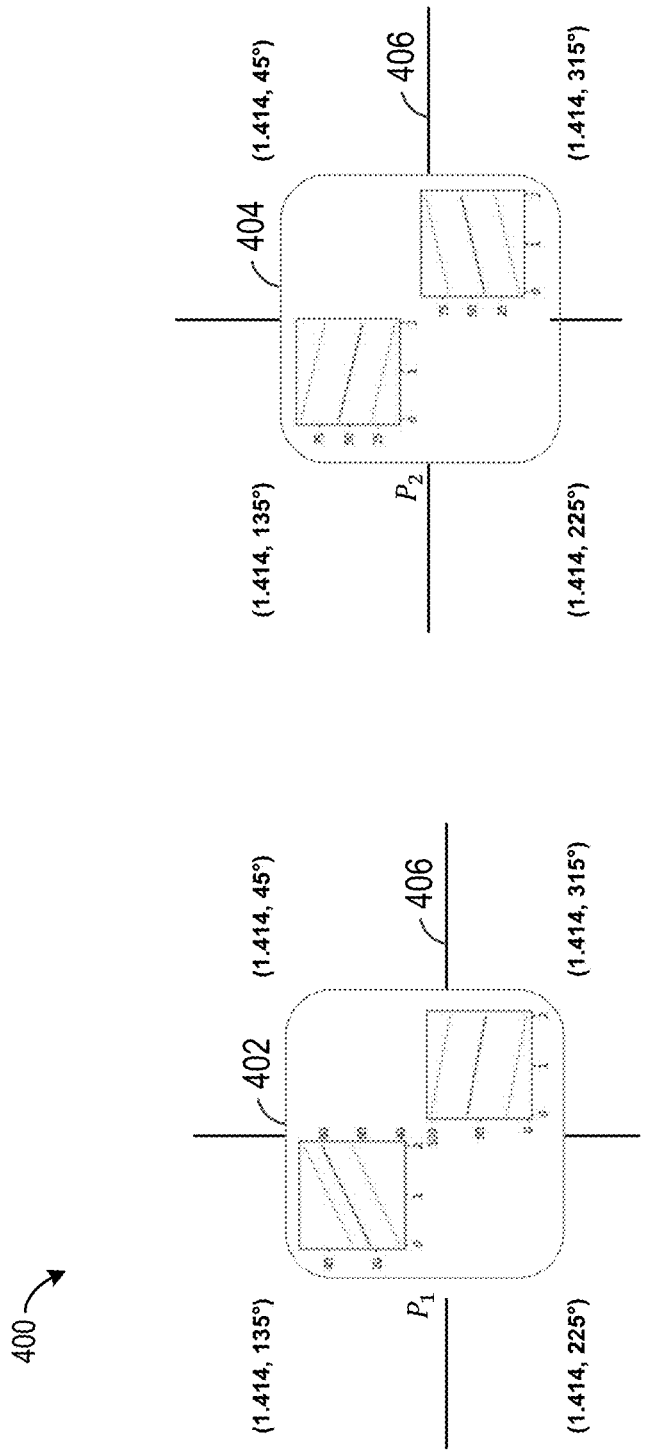

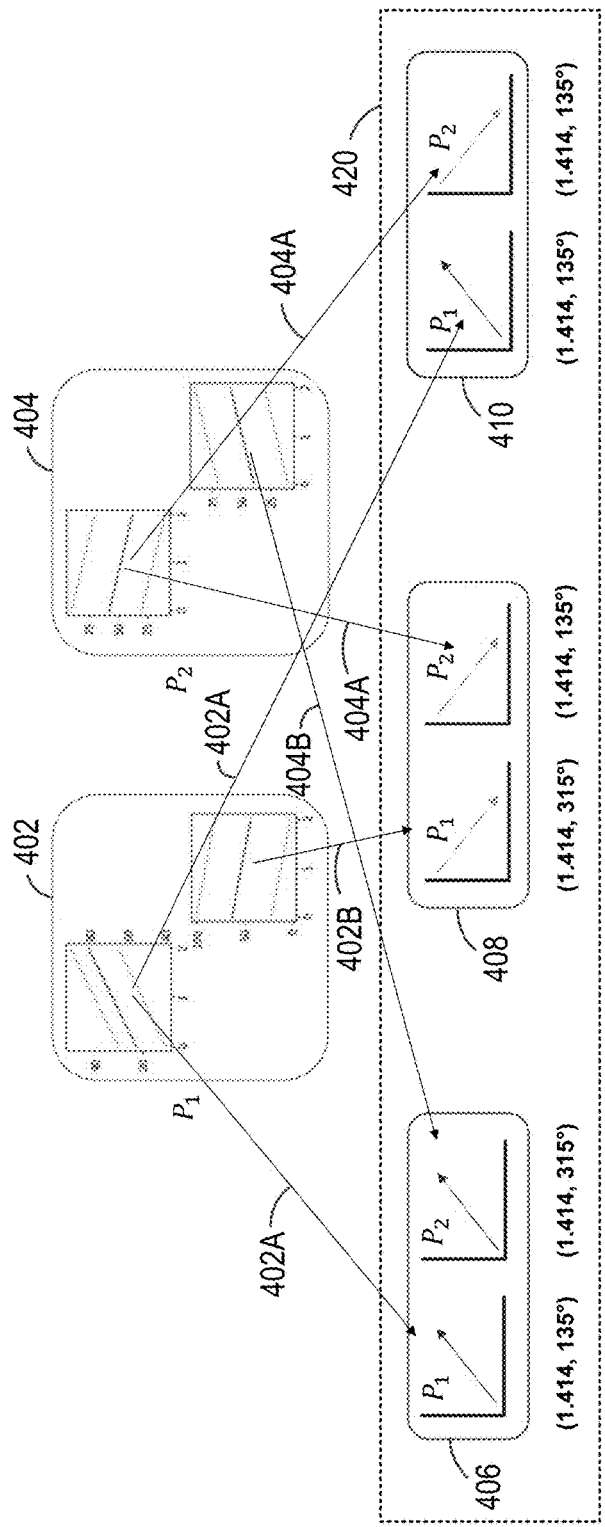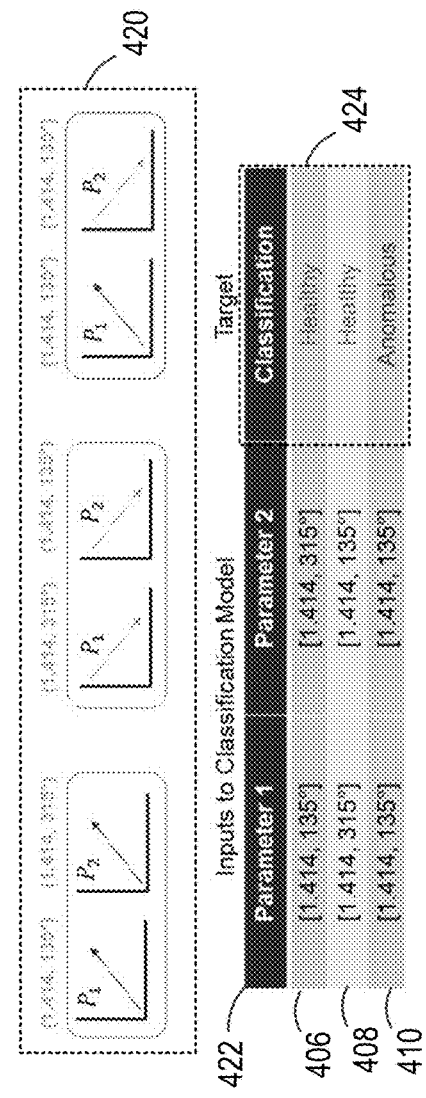
FIGURE 4B
FIGURE 4C

RELATIONAL TIME-SERIES CLASSIFICATION METHOD AND SYSTEM FOR CORROSION MAINTENANCE DISPATCH

FIELD

The present disclosure relates generally to corrosion determination based on analyzing parameters, and more particularly to relational time-series classification methods for corrosion maintenance dispatch.

BACKGROUND

Aircraft and other types of vehicles made out of metal are prone to corrosion, which is the gradual rusting of metal components. Although an application of paint on metal components of an aircraft can help delay corrosion, weather and the general use of the aircraft can still cause corrosion over time. When corroded portions of the aircraft are left untreated, the corrosion can make the aircraft unsafe for use. Thus, there exists a desire to efficiently predict a corrosion level for an aircraft based on past use and maintenance of the aircraft to enable streamlined corrosion maintenance dispatch.

SUMMARY

In one example, a method is described. The method involves generating, by a computing system, a self-organizing map for each parameter from a plurality of parameters. The plurality of parameters correspond to a plurality of aircraft, and the self-organizing map for a particular parameter from the plurality of parameters organizes time-series data associated with the particular parameter into a two-dimensional representation. The method further involves, for each self-organizing map, identifying a set of polar coordinates that represents a location of a particular node in a grid of nodes within the self-organizing map that is located closest to the time-series data organized in the two-dimensional representation. The method additionally involves providing sets of polar coordinates identified from each self-organizing map, along with respective indications of corrosion levels corresponding to the plurality of aircraft, as inputs into a classification model to train the classification model to determine one or more trends between the plurality of parameters. The classification model is configured to subsequently use the one or more trends collectively to estimate a corrosion level for a particular aircraft.

In another example, a system is described. The system includes a database having a plurality of parameters corresponding to a plurality of aircraft and a computing system. The computing system is configured to generate a self-organizing map for each parameter from the plurality of parameters. The self-organizing map for a particular parameter from the plurality of parameters organizes time-series data associated with the particular parameter into a two-dimensional representation. The computing system is also configured to, for each self-organizing map, identify a set of polar coordinates that represents a location of a particular node in a grid of nodes within the self-organizing map that is located closest to the time-series data organized in the two-dimensional representation. The computing system is further configured to provide sets of polar coordinates identified from each self-organizing map, along with respective indications of corrosion levels corresponding to the plurality of aircraft, as inputs into a classification model to train the classification model to determine one or more trends between the plurality of parameters. The classification model is configured to subsequently use the one or more trends collectively to estimate a corrosion level for a particular aircraft.

In an additional example, a non-transitory computer-readable medium is described. The non-transitory computer-readable medium is configured to store instructions, that when executed by one or more processors, cause a computing system to perform functions. The functions include generating a self-organizing map for each parameter from a plurality of parameters. The plurality of parameters correspond to a plurality of aircraft, and the self-organizing map for a particular parameter from the plurality of parameters organizes time-series data associated with the particular parameter into a two-dimensional representation. The functions also include, for each self-organizing map, identifying a set of polar coordinates that represents a location of a particular node in a grid of nodes within the self-organizing map that is located closest to the time-series data organized in the two-dimensional representation. The functions further include providing sets of polar coordinates identified from each self-organizing map, along with respective indications of corrosion levels corresponding to the plurality of aircraft, as inputs into a classification model to train the classification model to determine one or more trends between the plurality of parameters. The classification model is configured to subsequently use the one or more trends collectively to estimate a corrosion level for a particular aircraft.

The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 4A illustrates a first part of a classification model training process, according to an example implementation.

FIG. 4B illustrates a second part of the classification model training process, according to an example implementation.

FIG. 4C illustrates a third part of the classification model training process, according to an example implementation.

DETAILED DESCRIPTION

Figure 1:
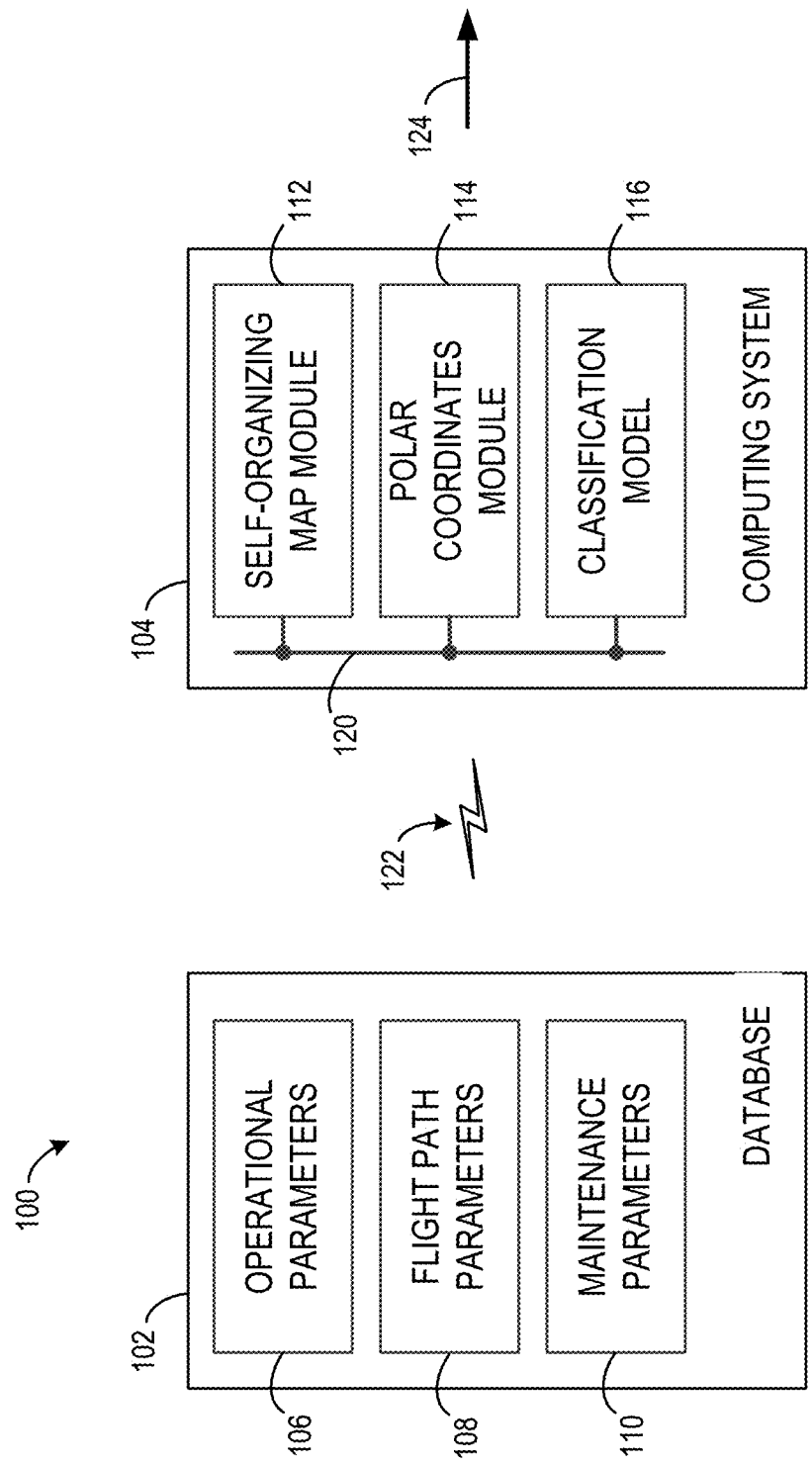
FIG. 1 is a block diagram of a system configured for corrosion maintenance determination, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

To effectively predict the amount of corrosion that is currently impacting an aircraft, it is useful to analyze information derived from the aircraft. The information analysis may include evaluating the relationship between the aircraft's operational and maintenance history. More specifically, data obtained about the aircraft that represents different operations performed by the aircraft as well as maintenance performed on the aircraft may be analyzed to predict a corrosion level for the aircraft.

One conventional method typically used to predict an aircraft's corrosion level (e.g., the amount of corrosion residing on the aircraft) involves classifying and predicting an individual time-series data based on the relationship between the operational and maintenance history. This conventional method, however, fails to predict how multiple time-series data sets derived from related events can affect a classification and the corresponding results. Particularly, the conventional method relies on extracting features (e.g., a maximum parameter value) from analyzed time-series data derived from an aircraft and providing the extracted features to train a classification model. The extraction process can result in a large loss of useful data since the process can involve reducing an entire time-series data set down to a few statistical calculations rather than analyzing the time-series data set as a whole. In turn, the classification model trained using the conventional method may subsequently fail to accurately estimate a corrosion level for an aircraft when analyzing parameters derived from the aircraft.

To avoid extraction issues and data loss that can arise when using the above conventional method, example implementations presented herein describe relational time-series classifications techniques for corrosion determination and subsequent maintenance. Unlike the conventional method, example embodiments may use information obtained about a group of aircraft to train a classification model to estimate corrosion level without reliance on feature extraction. Thus, example embodiments can maximize use of available data and help prevent useful data loss.

To illustrate an example embodiment, a system may involve a database that stores parameters derived from a number of aircraft (e.g., dozens, hundreds, thousands) and a corresponding computing system. Particularly, each parameter may be represented by data (e.g., time-series data) that was obtained from each aircraft of a group of aircraft. For instance, a flight parameter may include time-series data representing different flight paths flown by the various aircraft. An operational parameter may include time-series data that conveys how and where each aircraft was grounded (e.g., on an aircraft carrier or in storage). Similarly, a maintenance parameter may include data representing different repairs and maintenance performed on each aircraft, including corrosion maintenance. Within examples, data obtained from a group of aircraft can be organized according to a variety of different parameters.

The different parameters can specify useful information about the aircraft that can help train a classification model to subsequently estimate corrosion levels for an aircraft based on patterns detected between the parameters. Particularly, the computing system (e.g., one or more computing systems) within the system may obtain the parameters from the database and use data associated with each parameter to train the classification model for subsequent corrosion analyses.

The classification model training process may involve the computing system preparing the data associated with the parameters obtained from the aircraft for use to train the classification model. For instance, the computing system may initially generate a self-organizing map for each parameter derived from the aircraft. A self-organizing map is a computational technique that can be used to organize data associated with the parameter into a two-dimensional representation. Thus, the time-series data derived from each aircraft of the group of aircraft can be compiled together according to type of parameter and subsequently mapped via a self-organizing map.

Building a self-organizing map may involve positioning a grid of nodes in a dataspace with the time-series data associated with a parameter (e.g., an operational parameter). As indicated above, the time-series data may represent data related to a type of parameter that was acquired from numerous aircraft (or other types of vehicles) to enable an analysis of the different historical situations that each aircraft encountered, such as the different repairs performed, the various flight paths navigated, etc. Before the analysis between parameters to detect patterns can occur, the computing system may use self-organizing maps to organize data for a particular parameter into a more manageable format (e.g., a two-dimensional representation).

As part of the iterative process to build the self-organizing map, the computing system may systematically or randomly select a data point from the time-series data and identify a node within the grid that is positioned closest to the selected data point. At this point, the identified node can be referred to as the best matching unit (BMU) and its position may be adjusted such that the node is moved toward the selected data point. Neighboring nodes within the grid of nodes are also moved toward the selected data point with nodes positioned closer to the BMU moved a greater distance than nodes positioned farther from the BMU. This process is repeated with the computing system selecting additional data points from the time-series data and adjusting positions of the grid of nodes as discussed above until the grid of nodes is stabilized. The grid of nodes may be stabilized when the positions of each node remain relatively fixed with respect to the time-series data within the self-organizing map. At this point, a self-organizing map may be considered built and may show clusters within the time-series data that did not initially appear evident.

Within examples, the computing system may build multiple self-organizing maps to accommodate the variety of parameters derived from a group of aircraft. For instance, the computing system may generate a self-organizing map for one or more operational parameters, one or more flight path parameters, and one or more maintenance parameters. Thus, rather than extracting features from the data for each parameter, the computing system may use self-organizing maps to process the information into a useful format and help prevent any data loss.

For each self-organizing map, the computing system may then identify a set of polar coordinates that represents a location of a particular node in a grid of nodes within the self-organizing map that is located closest to the data (e.g., the time-series data) organized in the two-dimensional representation. As indicated above, the self-organizing map may be considered generated when the grid of nodes is stabilized relative to the time-series data represented in the self-organizing map. The computing system may analyze the stabilized grid of nodes to identify the particular node within the grid that is located closest to the time-series data organized by the self-organizing map. The polar coordinates for the identified node may then be determined. For instance, the self-organizing map may be converted from rectangular coordinates to polar coordinates to enable the computing system to identify polar coordinates for the particular node.

Sets of polar coordinates identified from each self-organizing map, along with indications of corrosion levels for aircraft, may be then provided as inputs into a classification model to train the classification model. The classification model may be trained by using the inputs to determine one or more trends between the parameters that can be collectively used to estimate a corrosion level of an aircraft. The trends may indicate that when data within two or more parameters align in a particular way, it is substantially more likely (or less likely) that the aircraft has corrosion. By analyzing large amounts of data, the classification model may determine trends that can then be used to predict corrosion levels based on parameters from an aircraft showing similar relationships to the trends. Thus, the trained classification model can then subsequently use the one or more trends collectively to quickly and efficiently estimate a corrosion level for a particular aircraft.

After the classification model is trained, the classification model can then analyze parameters derived from other aircraft to estimate the corrosion levels of the aircraft. For instance, the classification model may obtain operational, flight, and maintenance parameters related to an aircraft and compare trends within the parameters to the trends determined during training. The comparison may enable the classification model to output whether the corrosion level of the aircraft exceeds a threshold level of corrosion. In some instances, the threshold level of corrosion may be used to determine when an aircraft requires some form of corrosion maintenance. For instance, when an aircraft's corrosion level falls below the threshold level of corrosion, the aircraft may not require corrosion maintenance. Conversely, when the aircraft's corrosion level exceeds the threshold level of corrosion, the aircraft may require some form of corrosion maintenance.

In some examples, the output from the classification model may help indicate how much corrosion maintenance an aircraft requires. For instance, the system may use the classification model's output to instruct the aircraft to navigate to a particular facility for corrosion maintenance when the output indicates that the aircraft's corrosion level exceeds a threshold corrosion amount. The system may also use the output to determine when corrosion maintenance may be delayed. In additional examples, the output may assist when determining the quantity of corrosion maintenance required. For instance, corrosion on some aircraft parts (e.g., wings) may require more immediate maintenance than corrosion on other aircraft parts (e.g., underbody).

Referring now to the Figures, FIG. 1 is a block diagram of a system configured for corrosion maintenance determination, according to an example implementation. The system 100 includes a database 102 and a computing system 104. The database 102 is shown with operational parameters 106, flight path parameters 108, and maintenance parameters 110, and the computing system 104 is shown with a self-organizing map module 112, a polar coordinates module 114, and a classification model 116. In addition, the computing system 104 and the database 102 are shown in engaging in wireless communication 122, which can enable the computing system 104 to obtain data from the database 102 for determining an output 124. These components are included to illustrate an example configuration for the system 100, but other configurations may include more or fewer components. In some examples, the computing system 104 may communicate with multiple databases. Additional configurations are described below.

The database 102 may be implemented as an organized collection of data that is stored and accessed electronically by a computing system (e.g., the computing system 104). As such, the database 102 may represent one or more databases configured to store and organize data related to one or more aircraft. For instance, the database 102 may organize and store data related to dozens, hundreds, or even thousands of aircraft. The database 102 may obtain the data from maintenance facilities, on-board aircraft computing systems, and/or other sources.

The data may specify information related to parameters associated with the aircraft. A parameter may represent a particular type of data derived from one or more aircraft. For instance, a first parameter may represent information related to flights flown by aircraft, such as distances flown, locations navigated, and other similar information, and a second parameter may represent information related to maintenance performed on the aircraft, such as repairs, parts replaced, and fluids refilled, etc. As such, the database 102 may store data related to multiple types of parameters such that each parameter can be expressed by a set of data derived from one or more aircraft.

In some instances, the data associated with a parameter may be time-series data. Time-series data represents data points measured over time and stored in time order. For instance, a time-series data set may include a series of data points indexed in time order. The data may be a sequence taken at successively equally spaced points in time, making it a sequence of discrete-time data. As such, the computing system 104 may perform time series analysis to analyze time-series data and extract meaningful statistics and other characteristics of the data. In some examples, the database 102 may be configured as a time-series database.

As shown in FIG. 1, the parameters represented by the data within the database 102 may include particular types of parameters, such as operational parameters 106, flight path parameters 108, and maintenance parameters 110. Other types of parameters related to the aircraft may be included within examples. The operational parameters 106 may include information related to the operations of one or more aircraft. For instance, the operational parameters 106 for an aircraft may indicate a quantity of hours corresponding to when the aircraft was grounded on an aircraft carrier and/or a quantity of hours corresponding to when the aircraft was grounded in a non-carrier environment. The flight path parameters 108 may provide information related to flights flown by an aircraft. For instance, the flight path parameters 108 for an aircraft may indicate the locations that the aircraft has navigated and/or a quantity of time that the aircraft has navigated over salt water. The maintenance parameters 110 may include information related to maintenance performed on an aircraft. The maintenance parameters 110 may include one or more corrosion maintenance parameters. For instance, a corrosion maintenance parameter may specify a quantity of corrosion maintenance performed on an aircraft and parts of the aircraft where corrosion maintenance was performed. The maintenance parameters 110 may also include other repair maintenance parameters, such as a repair parameter that indicates a repair history for an aircraft.

The computing system 104 may be implemented as one or more computing systems configured to perform operations described herein. For instance, the computing system 104 may utilize one or more components to estimate corrosion levels of aircraft or another type of vehicle. As shown, the computing system 104 may include a self-organizing map module 112, a polar coordinates module 114, and a classification model 116. These components may be part of the same computing system and/or positioned remotely from one another. In the embodiment shown in FIG. 1, these components are connected together via connection mechanism 120.

In some embodiments, the computing system 104 may obtain parameters from the database 102 via wireless communication 122. For instance, the computing system 104 may provide a request to the database 102 for a set of parameters containing information related to multiple aircraft. In response, the computing system 104 may obtain the set of parameters from the database 102. In some instances, the database 102 may provide automatic access and/or password protected access to information stored within the database 102 to the computing system 104.

The self-organizing map module 112 is configured to build self-organizing maps for data, such as parameters related to aircraft or other types of vehicles. A self-organizing map is a type of artificial neural network (ANN) that is trained using unsupervised learning to produce a low-dimensional (e.g., two-dimensional), discretized representation of the input space of the training samples, called a map, and is therefore a method to do dimensionality reduction. Self-organizing maps may differ from other ANNs since a self-organizing map may apply competitive learnings as opposed to error-correction learning (e.g., backpropagation with gradient descent) and may use a neighborhood function to preserve the topological properties of the input space. As such, the self-organizing map module 112 may use data (e.g., time-series data) related to a particular parameter (e.g., an operational parameter) and generate a self-organizing map to represent the data in a lower dimension (e.g., a two-dimensional representation).

Each data point in a data set (e.g., a time-series data set representative of a parameter) may compete for recognition within a self-organizing map. In some embodiments, a self-organizing map mapping process may start from initializing the weight vectors. From there, a sample vector is selected randomly and the map of weight vectors is searched to find which weight best represents that sample. Each weight vector has neighboring weights that are close to it. The weight that is chosen is rewarded by being able to become more like that randomly selected sample vector. The neighbors of that weight are also rewarded by being able to become more like the chosen sample vector. This allows the map to grow and form different shapes, such as a square, rectangular, hexagonal, or L-shape in a two-dimensional representation.

The polar coordinates module 114 can map nodes in a self-organizing map from Cartesian coordinates to polar coordinates and/or from polar coordinates to Cartesian coordinates. A polar coordinate system is a two-dimensional coordinate system in which each point on a plane is determined by a distance from a reference point and an angle from a reference direction. The reference point is analogous to the origin of a Cartesian coordinate system and is called the pole. The ray from the pole in the reference direction is the polar axis, the distance from the pole is called the radial coordinate, radial distance, or radius, and the angle is called the angular coordinate, polar angle, or azimuth. As such, the polar coordinates module 114 may map the grid of nodes and data arranged in two-dimensions by the self-organizing map to polar coordinates.

The classification model 116 may represent a process performed by one or more computing systems (e.g., the computing system 104) that attempts to draw some conclusion from observed values. Particularly, given one or more inputs, the classification model 116 may try to predict the value of one or more outcomes. Outcomes are labels that can be applied to a data set.

In some examples, the classification model 116 may be trained by providing a training set into the classification model 116. For instance, the training set may correspond to the polar coordinates determined from the self-organizing maps. The training set may also include indications of corrosion levels corresponding to the aircraft. As such, the classification model 116 may use the training set to determine one or more trends between parameters that can be used to estimate a corrosion level for an aircraft. The output 124 may correspond to one or more outputs generated by the computing system 104. Particularly, the output 124 may be estimated corrosion levels determined by the classification model 116. In some instances, the output 124 may be a binary output that indicates whether an estimated corrosion level for an aircraft exceeds a threshold corrosion level. The threshold corrosion level may indicate whether or not the aircraft requires corrosion maintenance. In further examples, the output 124 may indicate particular parts of an aircraft (or other type of vehicle) that require corrosion maintenance.

Figure 2:
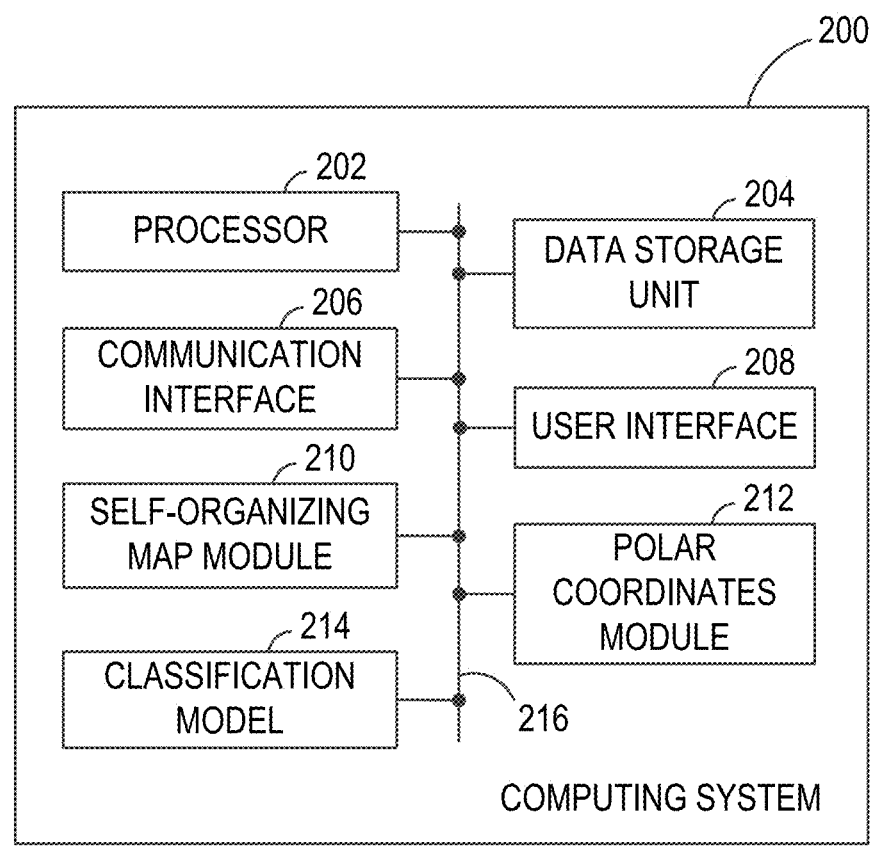
FIG. 2 is a block diagram of a computing system, according to an example implementation.

FIG. 2 is a block diagram of a computing system, according to an example implementation. The computing system 200 may represent an implementation of the computing system 104 shown in FIG. 1 and may perform various acts and/or functions, such as those described in this disclosure. The computing system 200 may include components, such as a processor 202, a data storage unit 204, a communication interface 206, a user interface 208, a self-organizing map module 210, a polar coordinates module 212, and a classification model 214. The components can be connected to each other (or to another device, system, or other entity) via a connection mechanism 216, and can include more or less components in other example implementations. In other embodiments, the computing system 200 may be implemented across multiple computing devices operating within a network.

In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless).

The position of the computing system 200 may vary within examples. In some instances, the computing system 200 may operate in a standalone configuration. In the standalone configuration, the computing system 200 may be located physically separate from aircraft or other types of vehicles being analyzed for corrosion. In other examples, the computing system 200 may be positioned on an aircraft or another type of vehicle.

The processor 202 may represent one or more general-purpose processors (e.g., a microprocessor) and/or one or more special-purpose processors (e.g., a digital signal processor (DSP)). As such, the processor 202 may include a combination of processors within examples. The processor 202 may perform operations, including processing data received from the other components within the computing system 200 and data obtained from external sources, such as the database 102 shown in FIG. 1.

The data storage unit 204 may include one or more volatile, non-volatile, removable, and/or non-removable storage components, such as magnetic, optical, or flash storage, and/or can be integrated, in whole or in part, with the processor 202. As such, the data storage unit 204 may take the form of a non-transitory computer-readable storage medium, having stored thereon program instructions (e.g., compiled or non-compiled program logic and/or machine code) that, when executed by the processor 202, cause the computing system 200 to perform one or more acts and/or functions, such as those described in this disclosure. Such program instructions can define and/or be part of a discrete software application. In some instances, the computing system 200 can execute program instructions in response to receiving an input, such as from the communication interface 206 or the user interface 208. The data storage unit 204 may also store other types of data, such as those types described in this disclosure.

In some examples, the data storage unit 204 may serve as a local storage for information obtained from one or more external sources. For example, the data storage unit 204 may store information obtained from the database 102 shown in FIG. 1. The computing system 200 may access stored information from the data storage unit 204 when performing a corrosion analysis of a vehicle (e.g., an aircraft).

The data storage unit 204 also can store instructions executable by the processor 202 to perform functions of the computing system 200. For example, any of the modules described herein may take the form of instructions executable by the processor 202 and the instructions can be stored on the data storage unit 204.

The communication interface 206 can allow the computing system 200 to connect to and/or communicate with another entity (e.g., the database 102, another computing device) according to one or more protocols. In an example, the communication interface 206 can be a wired interface, such as an Ethernet interface or a high-definition serial-digital-interface (HD-SDI). In another example, the communication interface 206 can be a wireless interface, such as a cellular or Wi-Fi interface. A connection can be a direct connection or an indirect connection, the latter being a connection that passes through and/or traverses one or more entities, such as a router, switcher, or other network device. Likewise, a transmission can be a direct transmission or an indirect transmission. The communication interface 206 may also utilize other types of wireless communication to enable communicating with one or more aircraft.

The user interface 208 can facilitate interaction between the database 102 and an administrator or user (e.g., a pilot or ATC), if applicable. As such, the user interface 208 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 208 can include hardware and/or software components that facilitate interaction between the computing system 200 and one or more users.

The self-organizing map module 210 may be used to generate self-organizing maps using data related to parameters. In some instances, the self-organizing map module 210 may be implemented as the self-organizing map module 112 shown in FIG. 1. Similarly, the polar coordinates module 212 may be implemented as the polar coordinates module 114 and the classification model 214 may be implemented as the classification model 116.

Figure 3A:
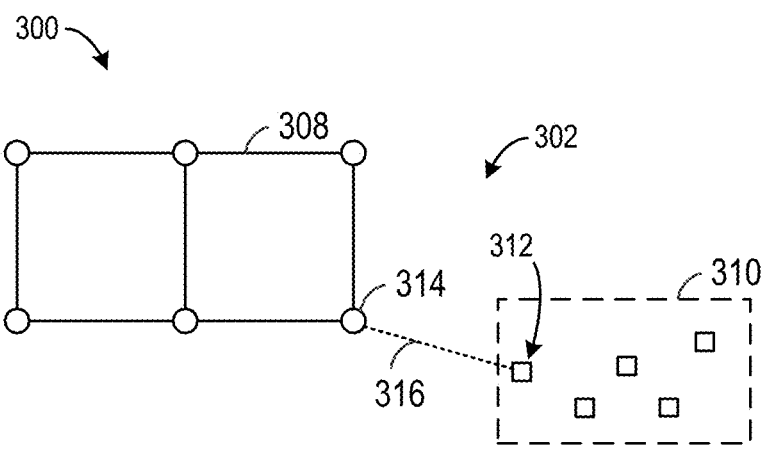
FIG. 3A depicts part of a self-organizing map mapping process, according to an example implementation.
Figure 3B:
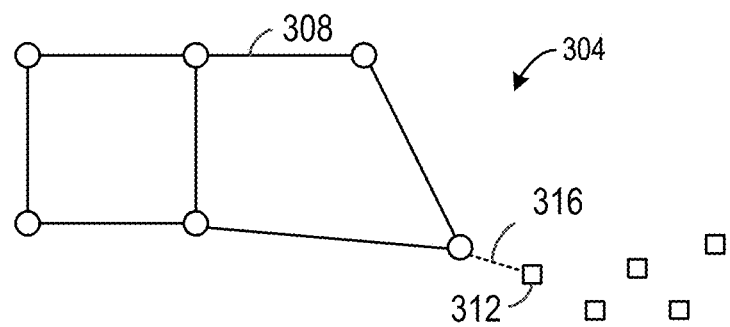
FIG. 3B depicts another part of the self-organizing map mapping process, according to an example implementation.
Figure 3C:
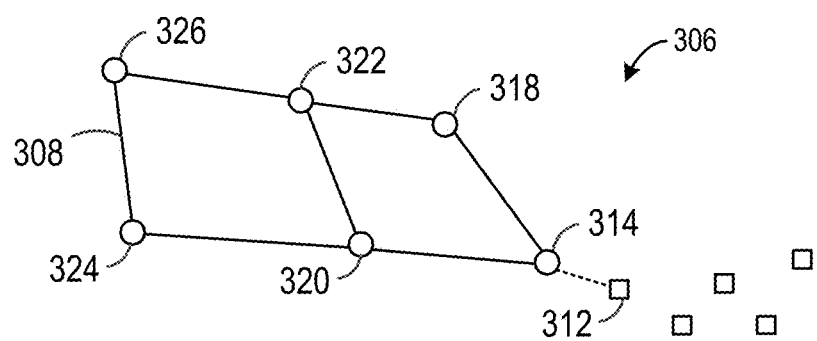
FIG. 3C depicts an additional part of the self-organizing map mapping process, according to an example implementation.

FIGS. 3A, 3B, and 3C depict a self-organizing map mapping process, according to an example implementation. The self-organizing map mapping process 300 shown in FIGS. 3A-3C includes steps 302, 304, and 306. Each of these steps 302-306 may be further divided or combined together within other examples. As such, the mapping process 300 may be performed by a self-organizing map module (e.g., the self-organizing map module 112 shown in FIG. 1 or the self-organizing map module 210 shown in FIG. 2) and/or a general computing system (e.g., the computing system 200 shown in FIG. 2). For illustration purposes, a computing system is described as performing the steps shown in FIGS. 3A-3C.

As discussed above, a self-organizing map is a clustering technique that can help uncover categories in large data sets. For instance, the self-organizing map mapping process 300 can involve an unsupervised neural network using nodes arranged in a single, two-dimensional grid. In some examples, the grid of nodes may be arranged as a grid of rectangles or a grid of hexagons. Building the self-organizing map can involve using multiple iterations of the steps 302-306 described herein with respect to data (e.g., time-series data) related to a particular parameter (e.g., operational, maintenance, or flight parameter). Iteratively performing these steps can enable nodes on the grid to gradually coalesce around areas with a high density of data points. As a result, areas with many nodes might reflect underlying clusters in the data. As the nodes move, they cause the grid of nodes 308 to bend and twist to more closely reflect the overall topological shape of the data.

Within examples, the quantity of nodes in the grid of nodes 308 can differ. In some instances, the quantity of nodes in the grid may depend on the amount of data being mapped via a self-organizing map. As such, the nodes in the grid may start in random positions and gradually move into positions that outline the shape of the data.

At step 302 shown in FIG. 3A, the computing system may randomly positon a grid of nodes 308 in the same dataspace as the underlying data set 310. The grid of nodes 308 is shown as a rectangular grid with six nodes, but can have other configurations within examples. In some instances, the quantity of nodes within the grid of nodes 308 may depend on the size of data in the data set 310. The data set 310 may include data that represents information related to a parameter associated with one or more vehicles. For instance, the data set 310 may include time-series data related to an operational parameter containing information obtained from a group of aircraft.

As shown in FIG. 3A, the computing system may select one data point (e.g., data point 312) either by randomly or systematically cycling through the data set 310 in order. Responsive to selecting the data point (i.e., the data point 312), the computing system may then find the node in the grid that is positioned closest to the data point 312. In the example shown in FIG. 3A, a node 314 is the node in the grid that is positioned closest to the data point 312. As such, this node 314 in the grid can be described as the Best Matching Unit (BMU) with respect to the data point 312 with the grid of nodes 308 and the data set 310 positioned as shown in FIG. 3A. In these positions, the node 314 is shown located at a distance 316 from the data point 312 of the data set 310.

At step 304 shown in FIG. 3B, the computing system may adjust the position of the node 314 by moving the node 314 closer toward the data point 312. As shown, the change in the distance 316 between the original position of the node 314 shown in FIG. 3A and the new position of the node 314 shown in FIG. 3B represents an example change in position of the node 314 closer to the data point 312. This change in the position of the node 314 is determined by a learning rate, which decreases after each iteration of the steps 302-306.

At step 306 shown in FIG. 3C, the computing system may move the neighboring nodes in the grid of nodes 308 closer to the data point 312. Particularly, the nodes 318, 320, 322, 324, 326 may be moved by their positions relative to the BMU (i.e., the node 314). The nodes positioned closer to the particular node 314 may move a greater distance towards the data point 312 than nodes in the grid positioned farther from the particular node 314. For instance, the nodes 318, 320 are shown positioned closer to node 314 than the other nodes in the grid (i.e., nodes 322, 324, 326). Therefore, nodes 318, 320 may move a greater distance towards the data point 312 than the nodes 322, 324, 326. As further shown, since node 326 is positioned the farthest from the data point 312 and the particular node 314, node 326 may move the least out of all the nodes in the grid of nodes 308.

In some examples, the computing system may identify the neighboring nodes positioned nearby the node 314 by extending a radius around the BMU (i.e., the node 314) referred to herein as the BMU radius. As such, similar to the learning rate, the value of the BMU radius may be decreased with each iteration of the steps 302-306.

As indicated above, the steps 302-306 may be performed again after updating the learning rate and/or the BMU radius. In some embodiments, the steps may be repeated dozens, hundreds, or even more times until the positions of nodes within the grid of nodes 318 are stabilized. The number of iterations may depend on the quantity and/or complexity of the data points within the data set 310. In some examples, the grid of nodes 308 qualifies as stabilized when the positions of each node in the grid of nodes 318 remained fixed relative to the time-series data (e.g., data set 310). As such, once the grid of nodes 308 is stabilized, the computing system may identify a particular node within the grid of nodes 308 that is located closest to the time-series data (e.g., data set 310) organized in the two-dimensional representation and determine polar coordinates for the particular node.

FIGS. 4A, 4B, and 4C illustrate a classification model training process, according to an example implementation. The training process 400 includes the application of different techniques to train a classification model (e.g., the classification model 116 shown in FIG. 1 or the classification model 214 shown in FIG. 2) to determine one or more trends between the parameters associated with a number of vehicles (e.g., a group of aircraft). The training process 400 can enable the classification model to estimate a corrosion level of an aircraft based on analyzing parameters related to the aircraft with respect to the determined trends. Although the example embodiments shown in FIGS. 4A-4C relates to training a classification model to subsequently estimate corrosion levels of aircraft, similar techniques may be used to train a classification model to perform other operations.

FIG. 4A shows a first self-organizing map 402 representing data for a first parameter P1 and a second self-organizing map 404 representing data for a second parameter P2. The parameters P1, P2 may provide information related to a group of aircraft or another vehicle, such as operational, maintenance, and/or flight information. For instance, the first parameter P1 may represent historical operational information and the second parameter P2 may represent historical maintenance information obtained from the group of aircraft.

In some examples, the generation of the self-organizing maps 402, 404 may involve the generation process described above in FIGS. 3A-3C. For instance, the building of each self-organizing map 402, 404 may involve an unsupervised mapping process that groups time-series data together based on their trend, values, and shape. As further shown, each self-organizing map 402, 404 is positioned relative to a polar coordinate system 406.

FIG. 4B depicts an identification of sets of polar coordinates for the nodes which the time series data is closest to. Particularly, a computing system may determine the group of polar coordinates 420 based on analyzing polar coordinates representative of the nodes within the self-organizing maps 402, 404 initially shown in FIG. 4A. As such, the group of polar coordinates 420 includes a first set of polar coordinates 406, a second set of polar coordinates 408, and a third set of polar coordinates 410.

The self-organizing maps 402, 404 built for parameters P1, P2 may be analyzed to determine each set of the sets of polar coordinates 406, 408, 410. As shown, the first set of polar coordinates 406 represents a combination of polar coordinates 402A from the self-organizing map 402 with polar coordinates 404B from self-organizing map 404. The first set of polar coordinates 406 includes polar coordinates that extend in the same direction, which may symbolize a healthy trend between the parameters P1, P2.

The second set of polar coordinates 408 represents a combination of polar coordinates 402B from the self-organizing map 402 and polar coordinates 404A from the self-organizing map 404. Similar to the first set of polar coordinates 406, the second set of polar coordinates 408 includes polar coordinates that extend in the same direction, which may indicate a healthy trend between the parameters P1, P2.

The third set of polar coordinates 410 represents a combination of polar coordinates 402A from the self-organizing map 402 and polar coordinates 404A from the self-organizing map 404. Unlike the first set and second set of polar coordinates 406, 408, the third set of polar coordinates 410 is made up of polar coordinates extending in opposite directions from the parameters P1, P2. Thus, the third set of polar coordinates 410 may indicate an anomalous link between the parameters P1, P2.

FIG. 4C depicts inputs to a classification model and corresponding targets for training the classification model. The group of polar coordinates 420 derived in FIG. 4B may be provided as inputs into a classification model (e.g., the classification model 116 shown in FIG. 1 or the classification model 214 shown in FIG. 2) to train the classification model to detect trends among the parameters P1, P2. Particularly, training the classification model using the group of polar coordinates 420 may enable the classification model to subsequently estimate corrosion levels of aircraft based on analyzing parameters obtained from those aircraft.

A table 422 shown in FIG. 4C includes the inputs for training the classification model. The table 422 includes the polar coordinates 406, 408, 410 representative of parameters P1, P2 and indications of corrosion levels, which can be used to train the classification model to determine one or more trends between the parameters P1, P2. In particular, these trends may be collectively used by the classification model to estimate a corrosion level for an aircraft or another type of vehicle.

Figure 5:
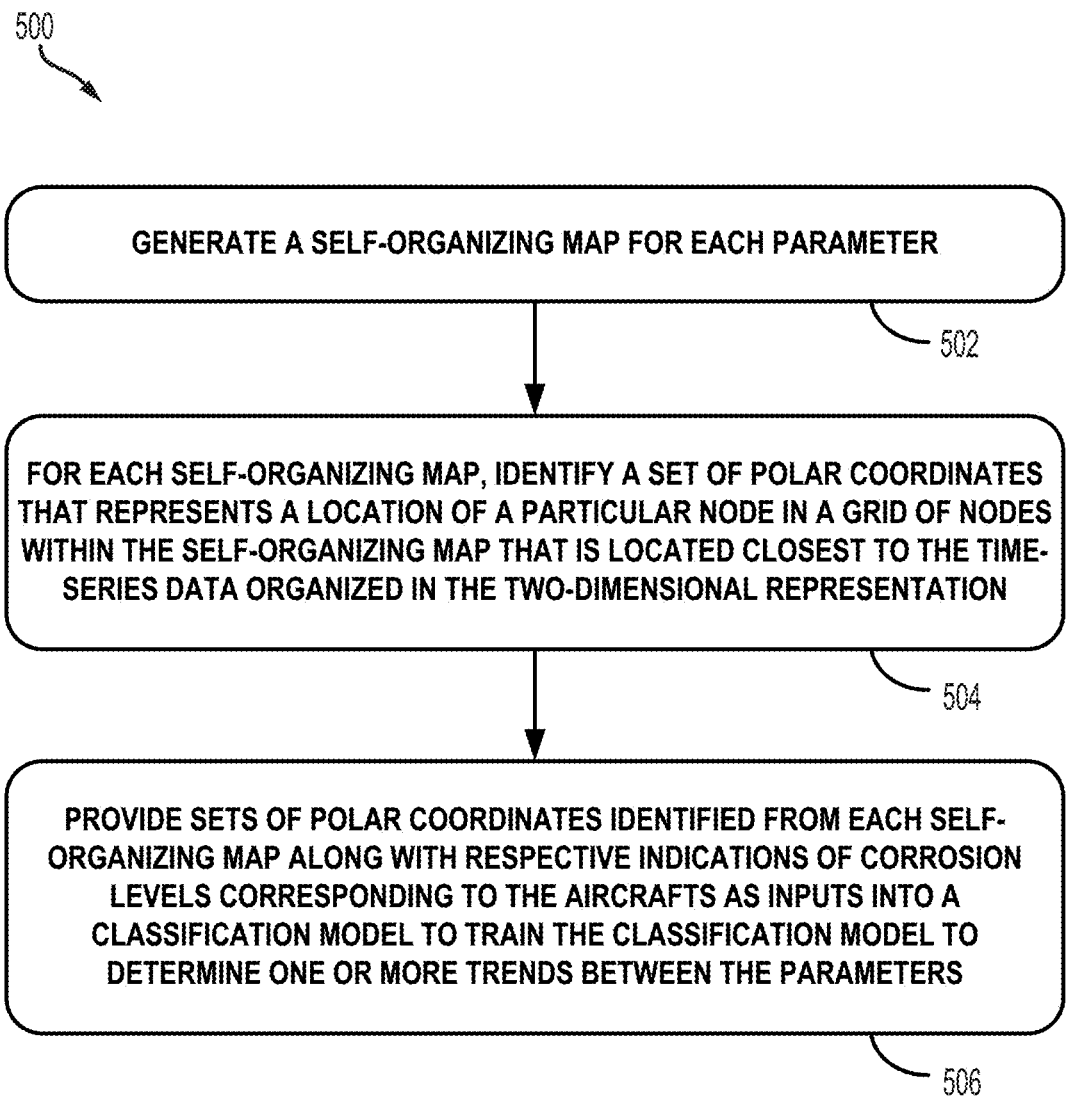
FIG. 5 shows a flowchart of a method, according to an example implementation.

FIG. 5 shows a flowchart of a method, according to an example implementation. The method 500 presents an example method that could be used with the system 100 shown in FIG. 1 and/or performed by the computing system 200 shown in FIG. 2. In other examples, components of the devices and/or systems may be arranged to be adapted to, capable of, or suited for performing the functions, when operated in a specific manner.

The method 500 can include one or more operations, functions, or actions as illustrated by one or more of blocks 502, 504, and 506. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 502, the method 500 involves generating a self-organizing map for each parameter. Each parameter may be from a group of parameters that correspond to a set of aircraft (e.g., dozens, hundreds, etc., of aircraft). Data obtained from each aircraft of the set of aircraft may be organized according to parameters, such as operational parameters, flight parameters, and maintenance parameters. For instance, time-series data may be obtained from a computing system of each aircraft and compiled according to parameters within a database.

In some embodiments, the computing system performing the method 500 may be positioned remotely from the set of aircraft. For instance, the computing system 104 shown within the system 100 depicted in FIG. 1 may be configured to obtain the group of parameters that represent information about the aircraft from the database 102.

The self-organizing map for a particular parameter from the group of parameters organizes time-series data associated with the particular parameter into a two-dimensional representation. The generation process may involve positioning a grid of nodes in a dataspace with time-series data associated with a first parameter from the group of parameters and selecting a first data point of the time-series data. As shown in FIGS. 3A-3C, the computing system may place a grid of nodes arranged in a rectangular grid or a hexagonal grid in the dataspace with time-series data associated with a first type of parameter (e.g., an operational parameter) that represents information about one or more aircraft. The generation process may then involve identifying a first node from the grid of nodes that is closest to the first data point and adjusting a first position of the first node (i.e., the current position of the first node) toward the first data point. Responsive to adjusting the first position of the first node toward the first data point, the generation process may also involve adjusting respective positions of nodes positioned nearby the first node within the grid of nodes toward the first data point such that nodes positioned closer to the first node move a greater distance than nodes positioned farther from the first node.

The generation process may further involve performing the process iteratively by selecting different data points in the time-series data. For instance, the generation process may involve selecting a second data point of the time-series data and identifying a second node from the grid of nodes that is closest to the second data point. The second node may be the same node identified above or a different node based on the position of the grid of nodes relative to the second data point. As such, the generation process may involve adjusting a second position of the second node toward the second data point and subsequently adjusting respective positions of nodes positioned nearby the second node within the grid of nodes toward the second data point such that nodes positioned closer to the second node move a greater distance than nodes positioned farther from the second node responsive to adjusting the second position of the second node toward the second data point.

This generation process (or a similar self-organizing map process) may be repeated until a determination is made that the grid of nodes is stabilized. The grid of nodes may be stabilized, for instance, when the positions of each node in the grid remains fixed relative to the time-series data within the self-organizing map. As such, the generation process may involve identifying a particular node, in the grid of nodes within the self-organizing map, that is located closest to the time-series data organized in the two-dimensional representation based on determining that the grid of nodes is stabilized.

In some examples, generating a self-organizing map for each parameter may involve generating the self-organizing map for one or more operational parameters. For instance, an operational parameter may indicate a first quantity of hours corresponding to when an aircraft was grounded on an aircraft carrier. An operational parameter may also indicate a second quantity of hours corresponding to when the aircraft was grounded in a non-carrier environment.

In some examples, the self-organizing map may be generated for a flight path parameter. For instance, the flight path parameter may indicate respective locations that an aircraft has navigated and a quantity of time that the aircraft has flown over salt water. A self-organizing map may also be generated for a corrosion maintenance parameter. The corrosion maintenance parameter may provide information specifying a quantity of corrosion maintenance performed on an aircraft and respective parts of the aircraft where corrosion maintenance was performed. In addition, in some instances, the self-organizing map may be generated for a repair parameter, which may indicate a repair history for an aircraft.

At block 504, the method 500 involves, for each self-organizing map, identifying a set of polar coordinates that represents a location of a particular node, in a grid of nodes within the self-organizing map, that is located closest to the time-series data organized in the two-dimensional representation.

In some examples, identifying the set of polar coordinates may involve mapping the grid of nodes from Cartesian coordinates to polar coordinates. By mapping the grid of nodes to polar coordinates, a set of polar coordinates that represents the location of the particular node within the self-organizing map can be identified. The particular node may be identified based on having a position closest to the time-series data organized in the two-dimensional representation. In some instances, the particular node is identified in response to determining that the grid of nodes of the self-organizing map has stabilized relative to the time-series data for a parameter.

At block 506, the method 500 involves providing sets of polar coordinates identified from each self-organizing map, along with respective indications of corrosion levels corresponding to the aircraft, as inputs into a classification model to train the classification model to determine one or more trends between the parameters. The type of classification model may vary within examples. For instance, the classification model may be a random forest model or a support vector machine model.

Providing the sets of polar coordinates may involve combining multiple sets of polar coordinates identified from multiple self-organizing maps into a collection. A number of indications of known corrosion levels corresponding to the aircraft may also be added to the collection. Each indication may specify whether a particular corrosion level of a corresponding aircraft exceeded a threshold corrosion level. As such, the collection may then be provided as a particular input into the classification model to train the classification model to subsequently detect trends between parameters that indicate corrosion levels for aircraft.

In some examples, the classification model may be trained to compare parameters corresponding to an aircraft with the one or more trends such that the classification model outputs a binary indication that specifies whether the corrosion level for the aircraft exceeds a threshold corrosion level. For instance, a "1" may indicate that the aircraft likely includes corrosion that exceeds the threshold and a "2" may indicate that the aircraft likely has an amount of corrosion that falls below the threshold.

In some embodiments, the method 500 may involve obtaining a set of parameters corresponding to an aircraft. For instance, the parameters may represent information related to an aircraft undergoing tests for corrosion, such as operational, flight, maintenance, and repair parameters. The method 500 may further involve estimating a particular corrosion level of the aircraft based on an analysis of the set of parameters by the trained classification model. For instance, the classification model may analyze the set of parameters to estimate whether the corrosion level of the particular aircraft exceeds a threshold corrosion level.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
generating, by a computing system, a self-organizing map for each parameter from a plurality of parameters, wherein the plurality of parameters correspond to a plurality of aircraft, wherein the plurality of parameters obtained from each aircraft of the plurality of aircraft includes:
a set of operational parameters that represent a first quantity of time that an aircraft was grounded on an aircraft carrier, and a second quantity of time that the aircraft was grounded in a non-carrier environment,
a set of maintenance parameters that represent repairs and maintenance performed on the aircraft, wherein the set of maintenance parameters includes a corrosion maintenance parameter that provides information specifying a quantity of corrosion maintenance performed on an aircraft and respective parts of the aircraft where corrosion maintenance was performed, and
a set of flight parameters that represent a third quantity of time that the aircraft has flown over salt water and flight paths flown by the aircraft, and
wherein the self-organizing map for a particular parameter from the plurality of parameters organizes time-series data associated with the particular parameter into a two-dimensional representation;
for each self-organizing map, identifying a set of polar coordinates that represents a location of a particular node, in a grid of nodes within the self-organizing map, that is located closest to the time-series data organized in the two-dimensional representation; and
providing sets of polar coordinates identified from each self-organizing map, along with respective indications of corrosion levels corresponding to the plurality of aircraft, as inputs into a classification model to train the classification model to determine one or more trends between the plurality of parameters, wherein the classification model is configured to subsequently use the one or more trends collectively to estimate a corrosion level for a particular aircraft.

2. The method of claim 1, further comprising:
obtaining a set of parameters corresponding to a particular aircraft; and
estimating a particular corrosion level of the particular aircraft based on an analysis of the set of parameters by the classification model.

3. The method of claim 2, wherein said estimating the particular corrosion level of the aircraft comprises:
estimating whether the particular corrosion level of the particular aircraft exceeds the threshold corrosion level.

4. The method of claim 1, wherein said generating the self-organizing map for each parameter comprises:
generating the self-organizing map for a repair parameter, wherein the repair parameter indicates a repair history for an aircraft.

5. The method of claim 1, wherein said generating the self-organizing map for each parameter comprises:
positioning the grid of nodes in a dataspace with time-series data associated with a first parameter from the plurality of parameters;
selecting a first data point of the time-series data;
identifying a first node from the grid of nodes that is closest to the first data point;
adjusting a first position of the first node toward the first data point; and
responsive to said adjusting the first position of the first node toward the first data point, adjusting respective positions of nodes positioned nearby the first node within the grid of nodes toward the first data point such that nodes positioned closer to the first node move a greater distance than nodes positioned farther from the first node.

6. The method of claim 5, further comprising:
selecting a second data point of the time-series data;
identifying a second node from the grid of nodes that is closest to the second data point;
adjusting a second position of the second node toward the second data point; and
responsive to said adjusting the second position of the second node toward the second data point, adjusting respective positions of nodes positioned nearby the second node within the grid of nodes toward the second data point such that nodes positioned closer to the second node move a greater distance than nodes positioned farther from the second node.

7. The method of claim 6, further comprising:
determining that the grid of nodes is stabilized such that positions of each node in the grid of nodes remains fixed relative to the time-series data within the self-organizing map; and
based on said determining that the grid of nodes is stabilized, identifying the particular node in the grid of nodes within the self-organizing map that is located closest to the time-series data organized in the two-dimensional representation.

8. The method of claim 1, wherein said identifying the set of polar coordinates comprises:
mapping the grid of nodes from Cartesian coordinates to polar coordinates; and
identifying the set of polar coordinates that represents the location of the particular node within the self-organizing map based on mapping the grid of nodes from Cartesian coordinates to polar coordinates.

9. The method of claim 1, wherein said providing sets of polar coordinates comprises:
combining a plurality of sets of polar coordinates identified from a plurality of self-organizing maps into a collection;
adding a plurality of indications of corrosion levels corresponding to the plurality of aircraft to the collection, wherein each indication from the plurality of indications of corrosion levels specifies whether a particular corrosion level of a corresponding aircraft exceeded a threshold corrosion level; and
providing the collection as a particular input into the classification model.

10. The method of claim 1, wherein said providing sets of polar coordinates comprises:
training the classification model to compare parameters corresponding to an aircraft with the one or more trends such that the classification model outputs a binary indication that specifies whether the corrosion level for the aircraft exceeds a threshold corrosion level.

11. The method of claim 1, wherein generating the self-organizing map for each parameter comprises:
generating the self-organizing map by an artificial neural network (ANN) trained using unsupervised learning.

12. The method of claim 1, further comprising:
obtaining the plurality of parameters from the plurality of aircraft, wherein the plurality of aircraft includes at least a hundred aircraft.

13. A system comprising:
a database having a plurality of parameters corresponding to a plurality of aircraft, wherein the plurality of parameters obtained from each aircraft of the plurality of aircraft includes:
a set of operational parameters that represent a first quantity of time that an aircraft was grounded on an aircraft carrier, and a second quantity of time that the aircraft was grounded in a non-carrier environment,
a set of maintenance parameters that represent repairs and maintenance performed on the aircraft, wherein the set of maintenance parameters includes a corrosion maintenance parameter that provides information specifying a quantity of corrosion maintenance performed on an aircraft and respective parts of the aircraft where corrosion maintenance was performed, and
a set of flight parameters that represents a third quantity of time that the aircraft has flown over salt water and flight paths flown by the aircraft; and
a computing system configured to:
generate a self-organizing map for each parameter from the plurality of parameters, wherein the self-organizing map for a particular parameter from the plurality of parameters organizes time-series data associated with the particular parameter into a two-dimensional representation;
for each self-organizing map, identify a set of polar coordinates that represents a location of a particular node, in a grid of nodes within the self-organizing map, that is located closest to the time-series data organized in the two-dimensional representation; and
provide sets of polar coordinates identified from each self-organizing map, along with respective indications of corrosion levels corresponding to the plurality of aircraft, as inputs into a classification model to train the classification model to determine one or more trends between the plurality of parameters, wherein the classification model is configured to subsequently use the one or more trends collectively to estimate a corrosion level for a particular aircraft.

14. The system of claim 13, wherein the classification model is a random forest model.

15. The system of claim 13, wherein the classification model is a support vector machine model.

16. The system of claim 13, wherein the computing system is positioned remotely from the plurality of aircraft.

17. The system of claim 13, wherein the grid of nodes within the self-organizing map is arranged in a rectangular grid.

18. The system of claim 13, wherein the grid of nodes within the self-organizing map is arranged in a hexagonal grid.

19. A non-transitory computer-readable medium having stored therein instructions executable by one or more processors to cause a computing system to perform functions comprising:
generating a self-organizing map for each parameter from a plurality of parameters, wherein the plurality of parameters correspond to a plurality of aircraft, wherein the plurality of parameters obtained from each aircraft of the plurality of aircraft includes:
a set of operational parameters that represent a first quantity of time that an aircraft was grounded on an aircraft carrier, and a second quantity of time that the aircraft was grounded in a non-carrier environment,
a set of maintenance parameters that represent repairs and maintenance performed on the aircraft, wherein the set of maintenance parameters includes a corrosion maintenance parameter that provides information specifying a quantity of corrosion maintenance performed on an aircraft and respective parts of the aircraft where corrosion maintenance was performed, and
a set of flight parameters that represent a third quantity of time that the aircraft has flown over salt water and flight paths flown by the aircraft, and
wherein the self-organizing map for a particular parameter from the plurality of parameters organizes time-series data associated with the particular parameter into a two-dimensional representation;
for each self-organizing map, identifying a set of polar coordinates that represents a location of a particular node, in a grid of nodes within the self-organizing map, that is located closest to the time-series data organized in the two-dimensional representation; and providing sets of polar coordinates identified from each self-organizing map, along with respective indications of corrosion levels corresponding to the plurality of aircraft, as inputs into a classification model to train the classification model to determine one or more trends between the plurality of parameters, wherein the classification model is configured to subsequently use the one or more trends collectively to estimate a corrosion level for a particular aircraft.

20. The non-transitory computer-readable medium of claim 19, further comprising:

obtaining a set of parameters corresponding to an aircraft; and estimating a particular corrosion level of the aircraft based on an analysis of the set of parameters by the classification model.

* * * * *